(12) United States Patent
Abalos et al.

(10) Patent No.: US 6,764,207 B2
(45) Date of Patent: Jul. 20, 2004

(54) MIRROR HEAD ASSEMBLY

(75) Inventors: Santiago C. Abalos, Fort Wayne, IN (US); William R. Headlee, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 88 days.

(21) Appl. No.: 10/102,138

(22) Filed: Mar. 20, 2002

(65) Prior Publication Data

US 2002/0097584 A1 Jul. 25, 2002

Related U.S. Application Data

(62) Division of application No. 09/727,348, filed on Nov. 30, 2000, now Pat. No. 6,406,170.

(51) Int. Cl.[7] ................................................. B60Q 1/26
(52) U.S. Cl. ........................ 362/494; 362/135; 362/487
(58) Field of Search ................................ 362/494, 492, 362/135, 140, 141, 487, 259, 850, 855, 864, 865, 866

(56) References Cited

U.S. PATENT DOCUMENTS

| 4,830,326 | A | | 5/1989 | Schmidt et al. | |
|---|---|---|---|---|---|
| 5,615,054 | A | * | 3/1997 | Lang et al. | 359/844 |
| 5,687,035 | A | * | 11/1997 | Lang | 359/864 |
| 5,798,882 | A | | 8/1998 | Lang | |
| 5,984,496 | A | | 11/1999 | Malcomson | |
| 6,049,271 | A | | 4/2000 | Chu | |
| 6,059,419 | A | * | 5/2000 | Englander et al. | 359/872 |
| 6,406,170 | B1 | * | 6/2002 | Abalos et al. | 362/487 |

\* cited by examiner

Primary Examiner—Thomas M. Sember
Assistant Examiner—Jacob Y. Choi
(74) Attorney, Agent, or Firm—Jeffrey P. Calfa; Dennis Kelly Sullivan; Susan L. Lukasik

(57) ABSTRACT

A mirror head assembly for mounting adjacent to or at a distance from exterior surfaces of a vehicle. The mirror head assembly includes one or more mirrors that enable a person to view areas surrounding the vehicle that the person could not easily view via a direct line of site. One or more lights are mounted to an outer shell of the mirror head assembly. The outer shell of the mirror head assembly may be constructed with a narrow portion disposed between adjacent mirrors so that the mirror head assembly presents less obstruction to the view of persons in the vehicle of areas surrounding the vehicle.

3 Claims, 14 Drawing Sheets

MIRROR HEAD ASSEMBLY

This is a division of application Ser. No. 09/727,348, filed Nov. 30, 2000 now U.S. Pat. No. 6,406,170.

BACKGROUND OF THE INVENTION

The present invention relates to mirror mounting assemblies for mounting mirrors adjacent to or at a distance from exterior surfaces of a vehicle. It is well known to mount mirrors adjacent to or at a distance from exterior surfaces of a vehicle so that individuals may more easily view in the mirrors areas surrounding the vehicle that they could not easily see via a direct line of sight. Mirror mounting assemblies of vehicles generally comprise a mirror head assembly and mirror head mounting components. The mirrors of most mirror mounting assemblies are included in the mirror head assembly. The mirror head assembly provides protection for the mirror(s), which is/are often relatively fragile. The mirror head assembly may also be constructed in a manner such that the mirror head assembly has relatively little aerodynamic drag when the vehicle it is attached travels at speeds on roadways. Mirror head assemblies are generally mounted adjacent to or at a distance from the exterior surfaces of the vehicle by the mirror head mounting components, which generally include various members and brackets. Mirror mounting assemblies may have many different designs, which are well known, and which include many different constructions of and engagements to one another of the mirror head mounting components and the mirror head assembly.

It is fairly well known to mount more than one mirror and also other components to a single mirror mounting assembly of a vehicle. In addition to mirror head assemblies, various antennas and lights are often mounted to the mirror head mounting components of a vehicle. Mounting increasing numbers of separate independent components to the mirror head mounting components of a mirror mounting assembly may have a number of disadvantages. The amount of labor need to assemble the mirror mounting assembly and the components that are mounted to it increases as the number of separate independent components that are mounted to the mirror mounting assembly increases. Components necessary to mount each separate independent accessory to mirror mounting assemblies also add to the cost of the mirror mounting assembly and the vehicle. The aerodynamic drag of the mirror mounting assembly also generally increases as an increasing number of separate independent components are mounted to the mirror mounting assemblies of the vehicle. Each separate independent accessory that is mounted to the mirror mounting assemblies of a vehicle also obstructs the driver's and the passenger's view of the area surrounding the vehicle.

SUMMARY OF INVENTION

It is thus,—an object of the present invention to provide a mirror mounting assembly to which accessories such as antennas and lights may be mounted and which is relatively easy to assemble, aerodynamically efficient, relatively inexpensive, and presents relatively little viewing obstruction to the driver and passengers of the vehicle. The mirror mounting assembly of the present invention includes mirror head assembly mounting components and a mirror head assembly. The mirror head assembly of the present invention is mounted to the mirror head mounting components which, are, in turn, mounted to the vehicle. The mirror head assembly of the present invention includes a mirror head outer shell. The mirror head assembly also includes one or more mirrors are mounted adjacent the mirror head outer shell of the mirror head assembly. A majority of the mirror head outer shell is disposed on a side of each of the mirrors opposite their reflecting surfaces. The mirror head outer shell comprises a shell wall that is substantially continuous and is disposed primarily on a side of the mirrors of the mirror head assembly opposite their reflecting surfaces. The mirror head outer shell is constructed and positioned such that some portion of the shell wall is in line with substantially every portion of the reflecting surfaces of the mirrors of the mirror head assembly in directions perpendicular to the reflecting surfaces. In other words, some portion of the shell wall is disposed near substantially every portion of the peripheries of each of the mirrors of the mirror head assembly. A portion of the shell wall opposite the reflecting surfaces of the mirrors extends continuously and substantially unbroken between these portions of the shell wall disposed adjacent the peripheries of the mirrors. Thus, the mirror head outer shell protects the mirrors, with the exception of their reflecting surfaces, from being impacted by foreign objects. The mirror head assembly of the present invention includes one or more accessories such as lights or antennas mounted to the mirror head assembly in a position adjacent the mirror head outer shell. A mirror head assembly that has one or more accessories mounted directly to it has a number of advantages. Such a mirror head assembly provides for a mirror mounting assembly that is cost effective, easy to assemble, presents relatively little obstruction to the view of the driver and passengers of the vehicle, and has relatively little aerodynamic drag.

Thus, it can be seen that all of the above mentioned objects of the invention, as well as other objects not mentioned, have been met.

DRAWINGS

Other objects and advantages of the invention will become more apparent upon perusal of the detailed description thereof and upon inspection of the drawings in which.

DETAILS OF INVENTION

Figure 1:
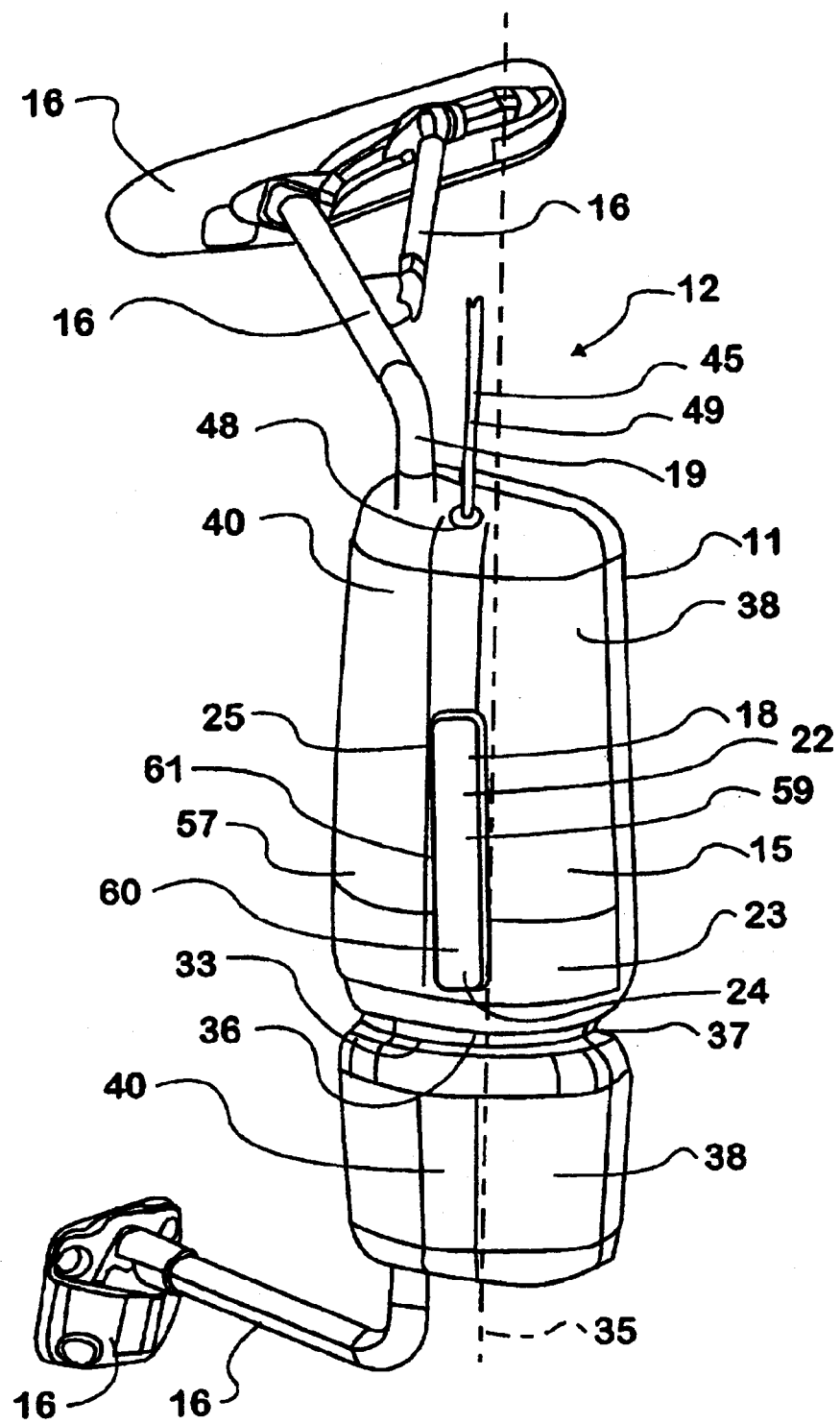
FIG. 1 is a perspective view of a mirror head assembly with a flush mounted light and mirror head mounting components according from a side of the mirror head assembly opposite the reflecting surfaces of the mirrors.
Figure 2:
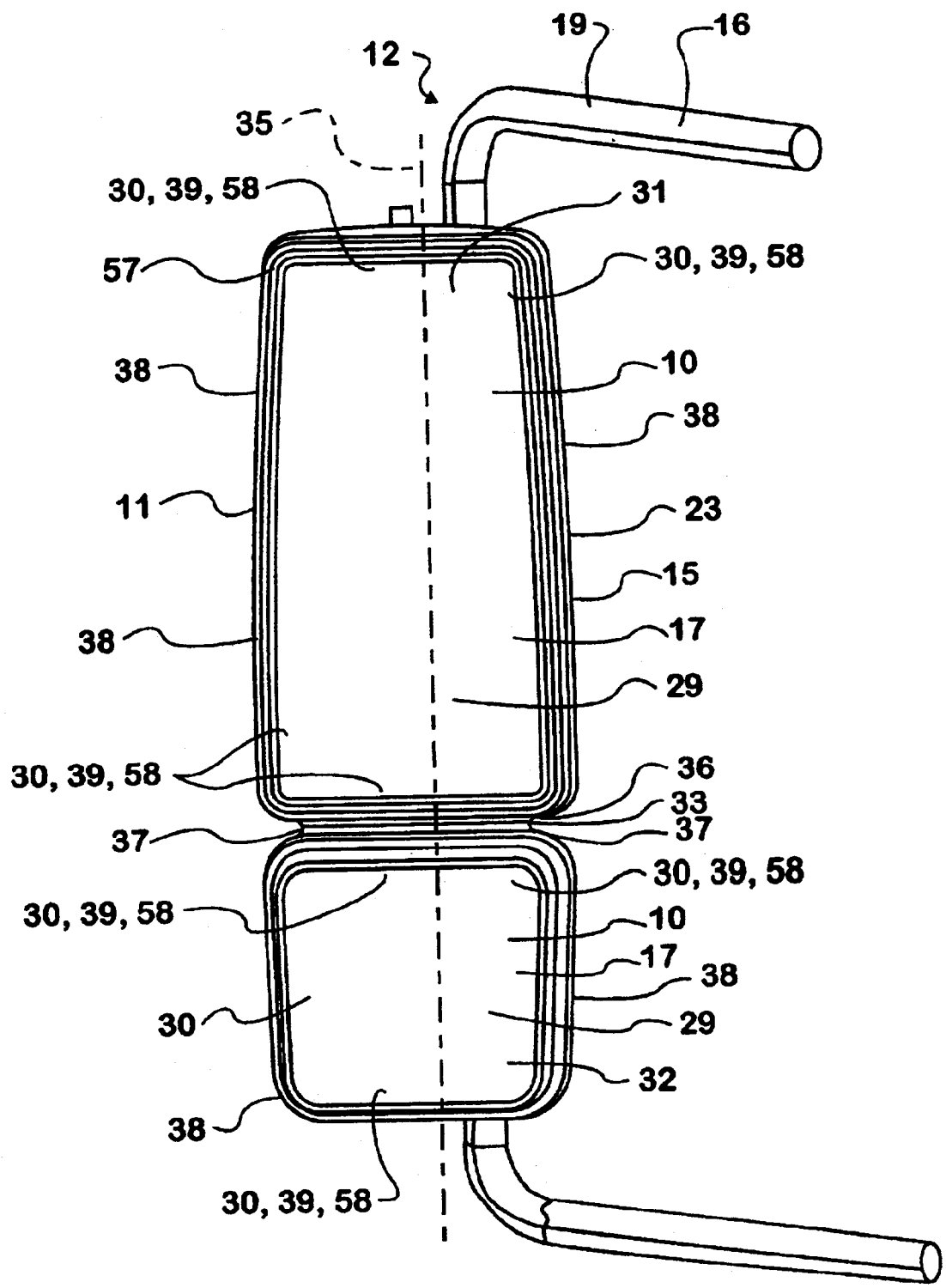
FIG. 2 is a perspective view of the mirror head assembly and mirror head mounting components of the invention in a direction facing the reflecting surfaces of the mirrors.
Figure 3:
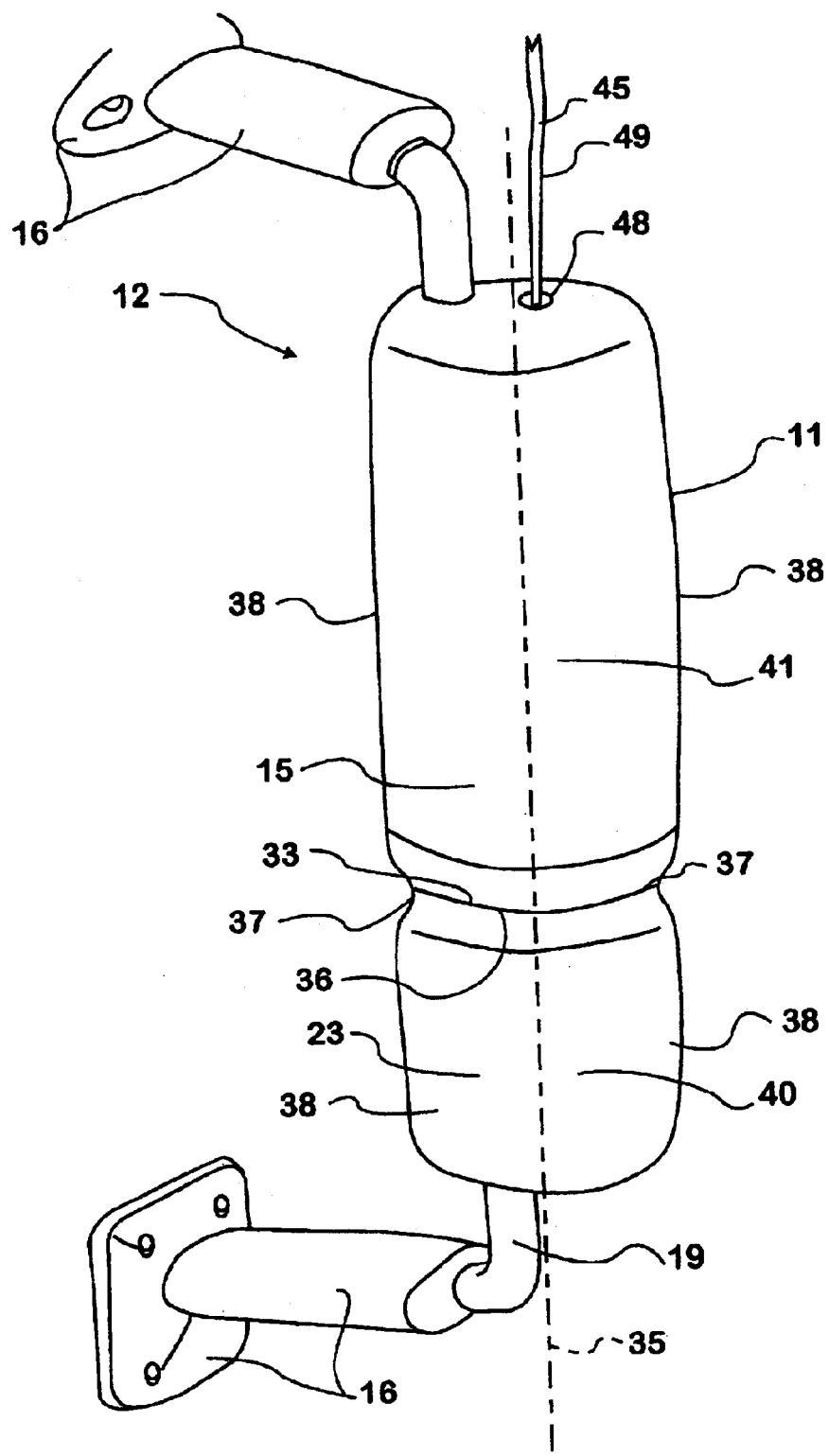
FIG. 3 is a perspective view of a mirror head assembly that does not have lights mounted to it and mirror head mounting components from a side of the mirror head assembly opposite the reflecting surfaces of the mirrors.
Figure 4:
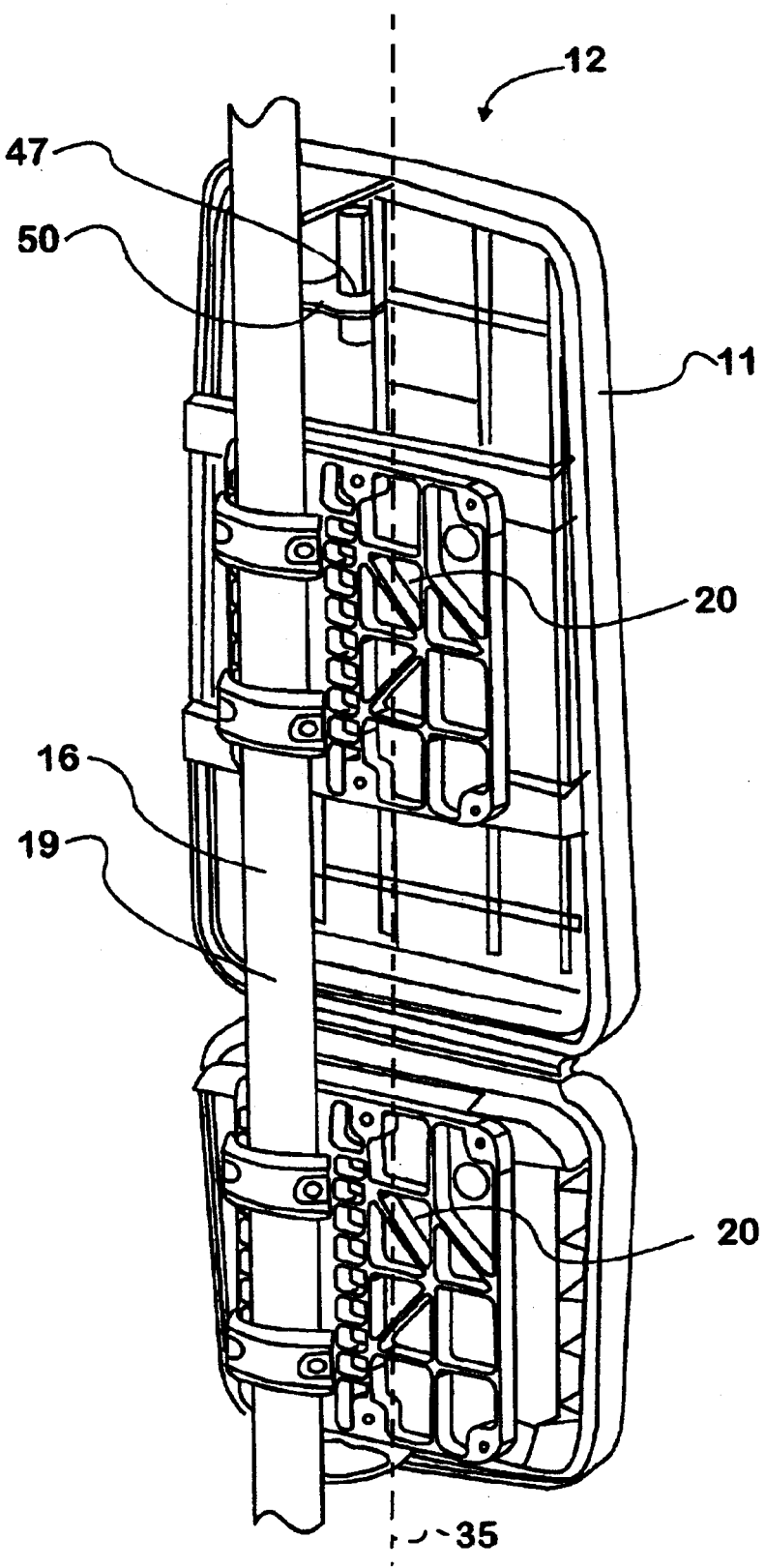
FIG. 4 is a perspective view of a partially assembled mirror head assembly mounted to mirror head mounting components.
Figure 5:
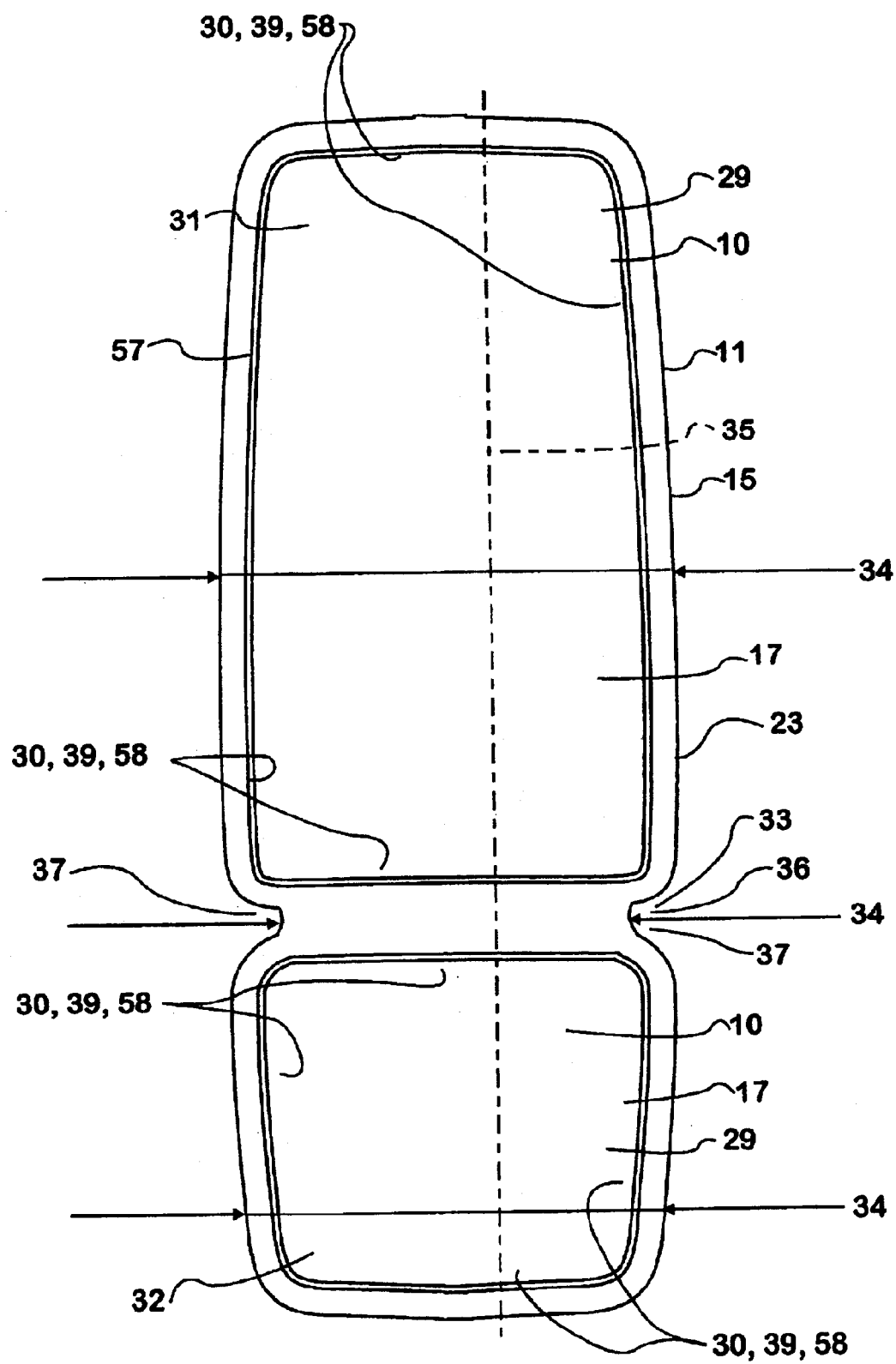
FIG. 5 is an elevational view of a mirror head assembly in a direction facing the reflecting surfaces of the mirrors.
Figure 6:
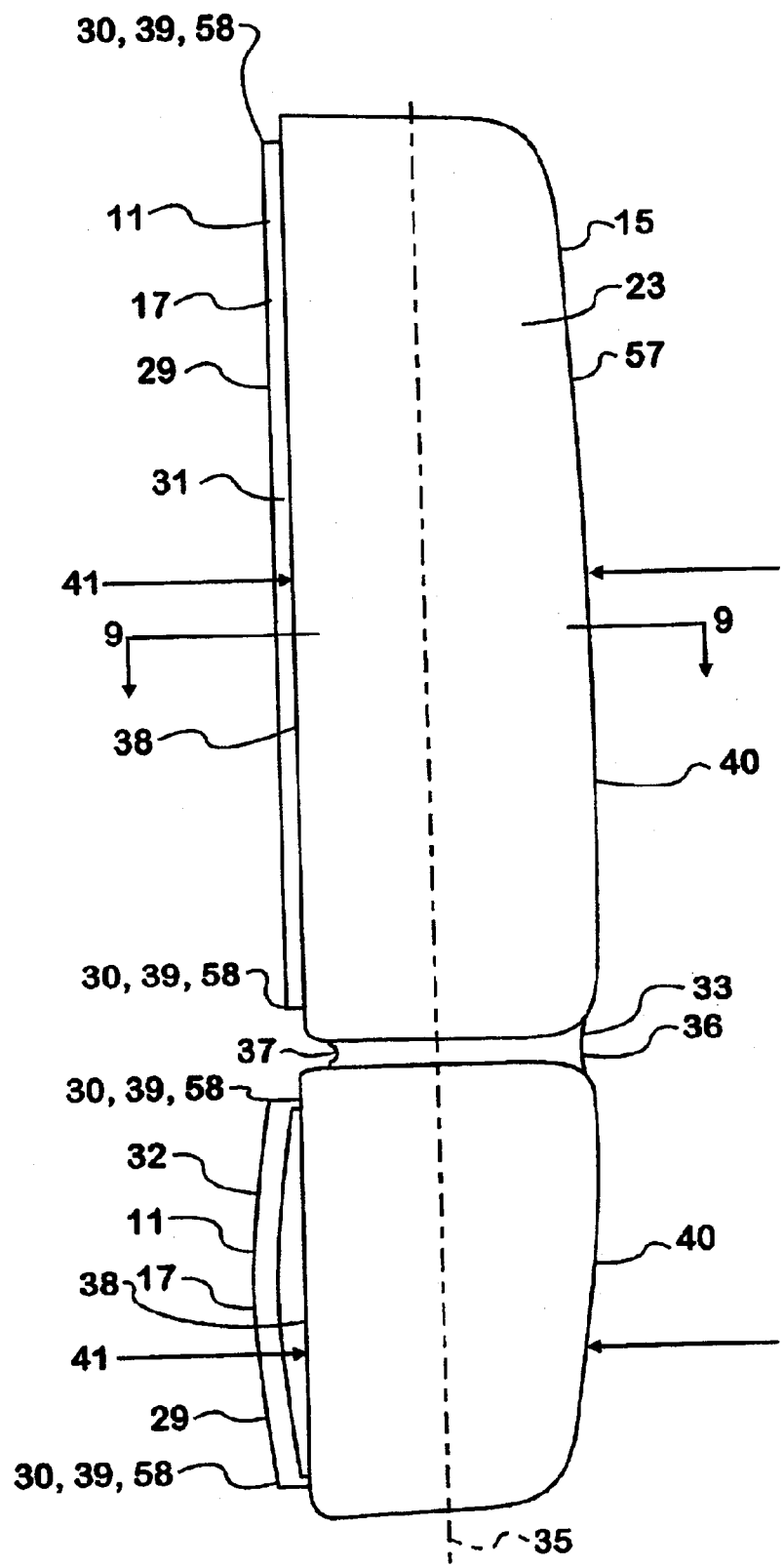
FIG. 6 is an elevational view of the mirror head assembly in a direction parallel to the reflecting surfaces of the mirrors and perpendicular to the longitudinal axis of the mirror head assembly.
Figure 7:
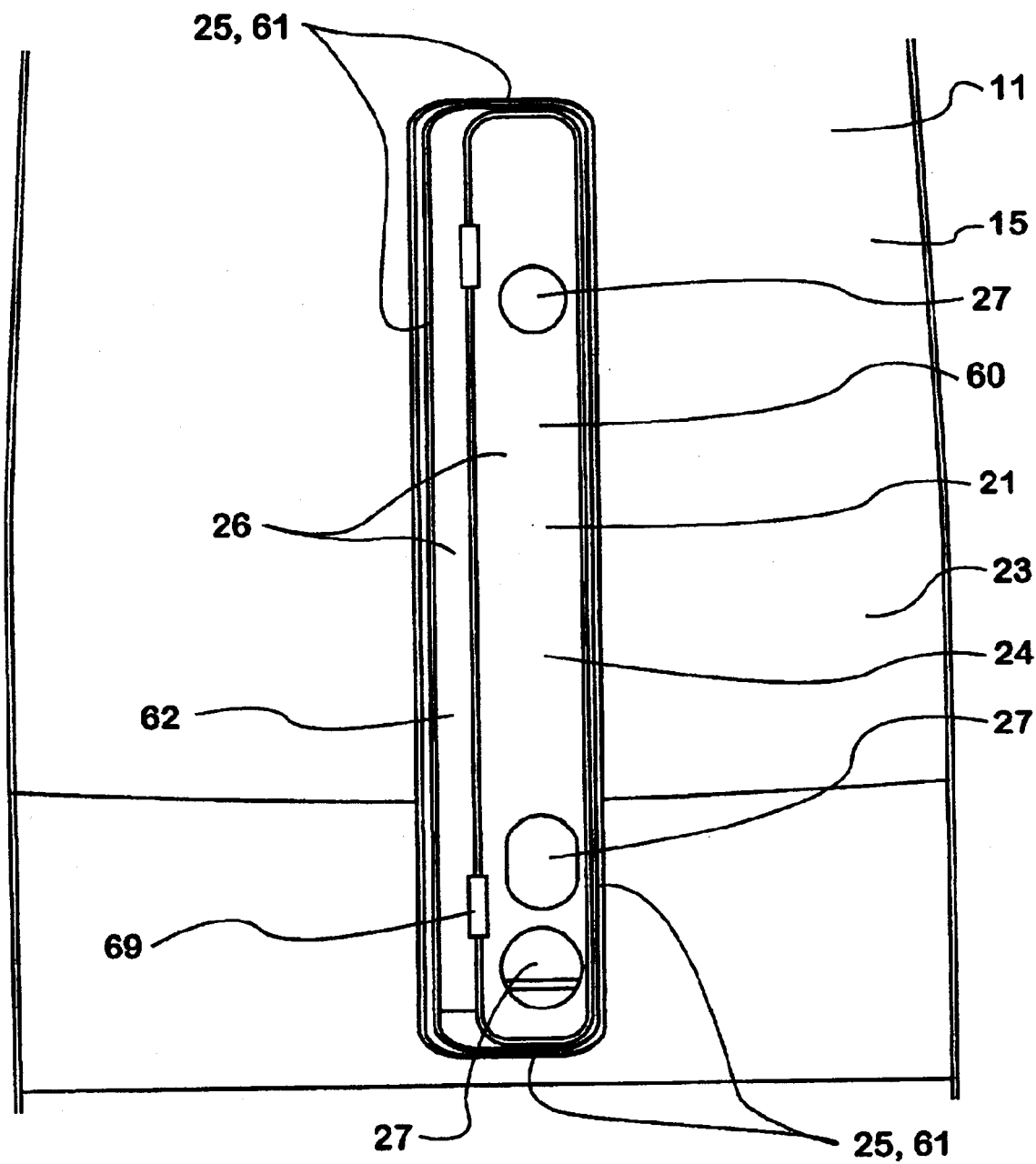
FIG. 7 is a close up perspective view from a first angle of the light reception recess of the mirror head outer shell.
Figure 8:
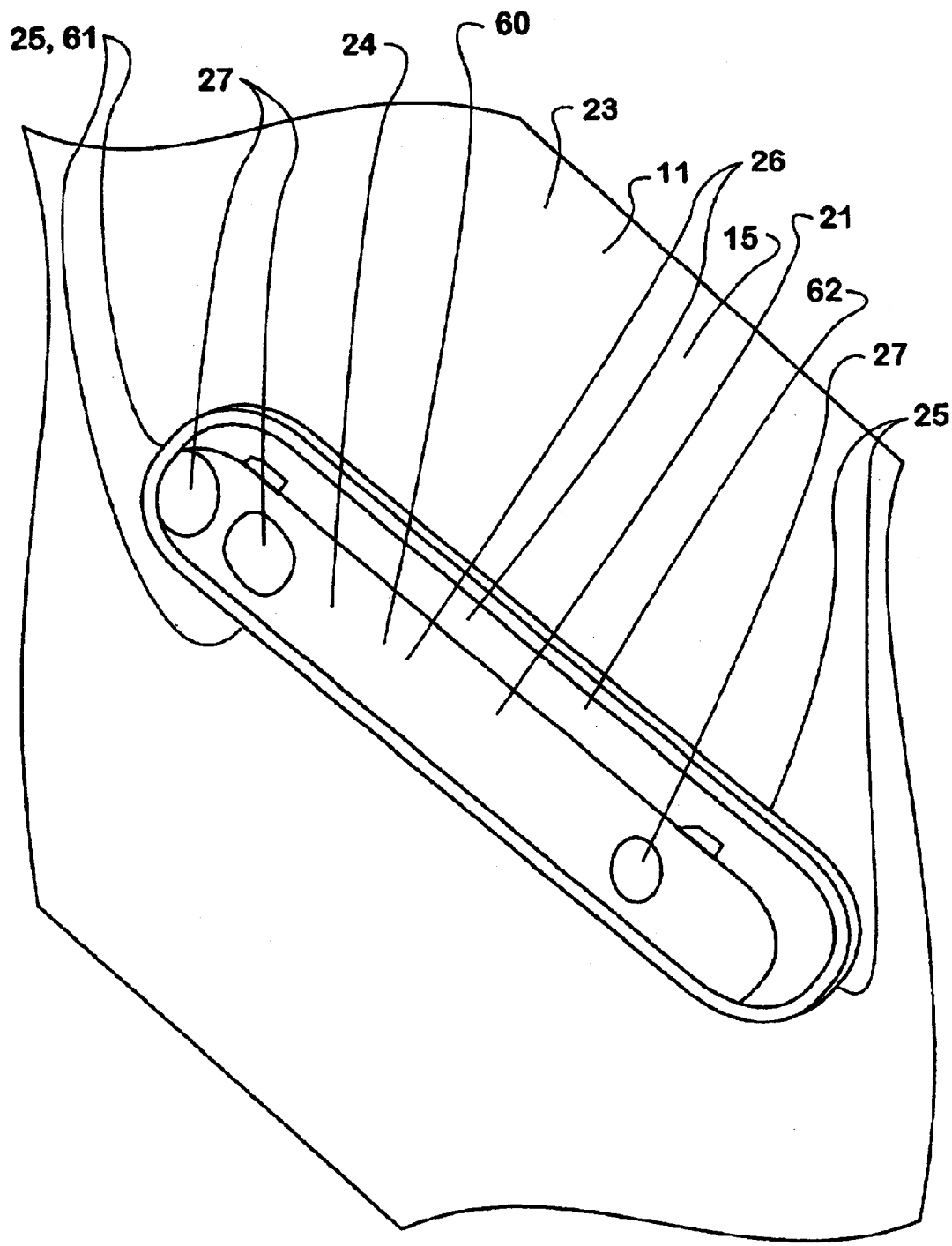
FIG. 8 is a close up perspective view from a second angle of the light reception recess of the mirror head outer shell.
Figure 9:
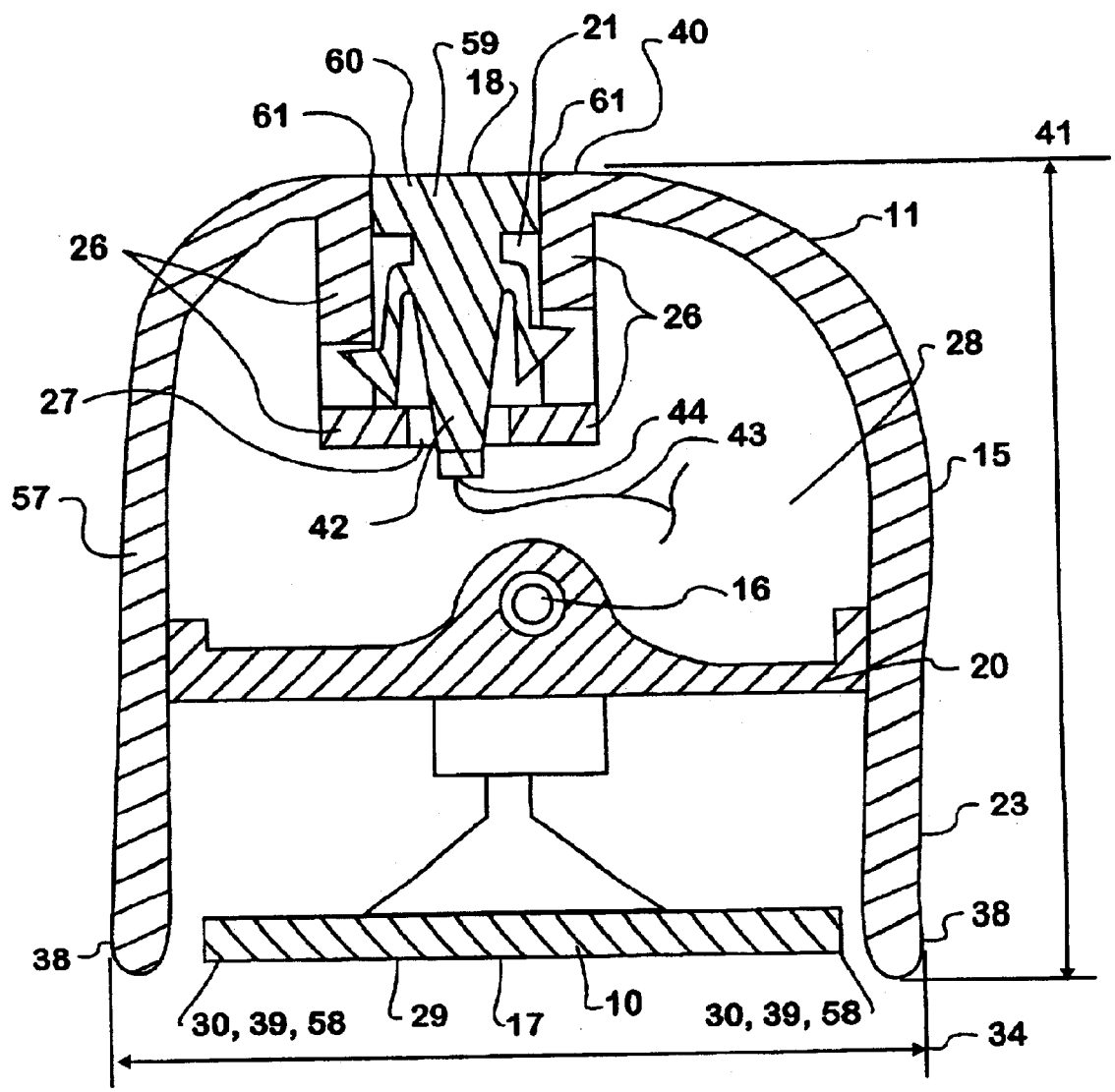
FIG. 9 is a sectional view of the mirror head assembly through line 9—9 of FIG. 6.

The mirror mounting assembly 12 of the present invention includes a mirror head assembly 11 and mirror head mounting components 16. The mirror head assembly 11 is mounted to the mirror head mounting components 16 of the mirror mounting assembly 12. The mirror head mounting components 16, are, in turn, mounted to a vehicle 13 such that the mirror head assembly 11 is positioned adjacent to or at a distance from exterior surfaces 14 of the vehicle 13. The mirror head assembly 11 includes one or more mirrors 17 and a mirror head outer shell 15. The purpose of the mirrors 17 of the mirror head assembly 11 is to allow individuals to view, in the mirrors 17, areas surrounding the vehicle 13 that they could not easily view via a direct line of sight. The primary purpose of the mirror head outer shell 15 is protection of the mirrors 17 of the mirror head assembly 11. The mirror head outer shell 15 is constructed and positioned such that a majority of the mirror head outer shell 15 is disposed on a side of each of the mirrors 17 opposite a reflecting surface 29 of each of the mirrors 17. The mirror head outer shell 15 comprises a shell wall 57 that is substantially continuous and is disposed primarily on a side of the mirrors 17 of the mirror head assembly 11 opposite their reflecting surfaces 29. The mirror head outer shell 15 is constructed and positioned such that some portion of the shell wall 57 is in line with substantially every portion of the reflecting surfaces 29 of the mirrors 17 of the mirror head assembly 11 in directions perpendicular to the reflecting surfaces 29. In other words, substantially any line that is perpendicular to and intersects a reflecting surface 29 of a mirror 17 also intersects a portion of the mirror head outer shell 15 at a point on a side of the mirror 17 opposite the reflecting surface 29. Thus, the mirror head outer shell 15 protects the mirrors 17 of the mirror head assembly 11 from impacts (with the exception of impacts to the reflecting surface 29 of each of the mirrors 17). The mirrors 17, the mirror head outer shell 15, and the mirror head mounting components 16 of the mirror mounting assembly 12 may be constructed and engaged to one another in any of a number of ways that are well known. One possible construction and engagement to one another of the components of the mirror head assembly 11 and the mirror head mounting components 16 is exemplified in the figures. In this example, the mirror head mounting components 16 include a c-shaped mirror head mounting member 19 that is pivotally mounted to the vehicle 13. Mirror head mounting base components 20 are included in the mirror head assembly 11 in the embodiment shown in the figures. The mirror head mounting base components 20 are mounted to the c-shaped mirror head mounting member 19. The mirrors 17 and the mirror head outer shell 15, are, in turn, mounted to the mirror head mounting base components 20.

The mirror head assembly 11 preferably includes one or more lights 18. The lights 18 of the mirror head assembly 11 would be mounted to the mirror head assembly 11 adjacent the shell wall 57 of the mirror head outer shell 15. Lights 18 may be mounted adjacent to the mirror head outer shell 15 of the mirror head assembly 11 in any of a number of ways. The lights 18 may be mounted directly to the mirror head outer shell 15. The lights 18 may, alternatively, be mounted to other components of the mirror head assembly 11 directly or indirectly. For instance, the lights 18 may be mounted adjacent to the shell wall 57 of the mirror head outer shell 15 through other components of the mirror head assembly 11 to structure such as the mirror head mounting base components 20. Mounting lights 18 to the mirror head assembly 11 as opposed to the mirror head mounting components 16 has a number of advantages. Mounting lights 18 to the mirror head assembly 11 is generally relatively cost effective because less parts are necessary to mount the lights 18 to the mirror mounting assembly 12 and less labor is generally required to assemble the mirror mounting assembly 12. The aerodynamic drag of a mirror mounting assembly 12 that includes lights 18 mounted to the mirror head assembly 11 is relatively lower than a mirror mounting assembly 12 that has the lights 18 mounted to the mirror head mounting components 16. A mirror mounting assembly 12 with lights 18 mounted to the mirror head assembly 11 as opposed to the mirror head mounting components 16 also presents less obstructions to the view of the driver and the passengers of the vehicle 13. The lights 18 mounted adjacent to the shell wall 57 of the mirror head outer shell 15 may have many different purposes. One purpose for the lights 18 mounted to the mirror head assembly 11 is as an aid in judging clearance between the mirror head assembly 11 and objects in the environment. The lights 18 mounted to the mirror head assembly 11 may be of many different types, including but not limited to incandescent lights and light emitting diodes. Preferably, the lights 18 mounted to the mirror head assembly 11 are of the light emitting diode type because they have a much longer service life than incandescent lights.

The mirror head assembly 11 may be constructed such that the light body 59 of one or more of the lights 18 of the mirror head assembly 11 is/are disposed partially inwardly of the outer surfaces 23 of the mirror head outer shell 15. In order to make this possible, the shell wall 57 of the mirror head outer shell 15 would define one or more light reception opening(s) 60. One or more of the light bodies 59 of the lights 18 may be disposed within the light reception openings 60 defined by the shell wall 57 of the mirror head outer shell 15. Thus, the light bodies 59 of the lights 18 that are disposed in the one or more light reception openings 60 protrude relatively little outwardly of the outer surfaces 23 of the mirror head outer shell 15. Preferably, the light bodies 59 of one or more of the lights 18 are positioned such that an outer lens surface 22 of each of the light bodies 59 is disposed generally contiguous and flush with outer surfaces 23 of the mirror head outer shell 15. It is also preferable that no part of the light body 59, of lights 18 that have their outer lens surface 22 so disposed, protrudes outwardly of the outer lens surface 22 in directions away from the outer surfaces 23 of the mirror head outer shell 15. A mirror head assembly 11 with lights 18 mounted in such a flush manner generally has a better appearance and is more aerodynamically efficient than a mirror head assembly 11 with lights 18 mounted partially outboard of the outer surfaces 23 of the mirror head outer shell 15. It is also preferable that any light reception openings 60 of the mirror head outer shell 15 and any light bodies 59 of lights 18 mounted within light reception openings 60 be of a complimentary shape so that the light reception openings 60 are filled by light bodies 59. In other words, it is preferable that the mirror head assembly 11 be constructed such that there are no substantial gaps between adjacent lights 18 disposed within light reception openings 60 or between light bodies 59 and adjacent reception opening peripheries 61 of the light reception openings 60. In the preferred embodiment, a single light body 59 is disposed within each of the light reception openings 60 of the mirror head assembly 11. In this embodiment, the outer lens surface 22 of each of the light bodies 59 is of the same shape and is sized just slightly smaller than the light reception opening 60 within which the light body 59 is disposed.

In the preferred embodiment, the mirror head outer shell 15 defines a light reception recess 21 inwardly of each of the light reception openings 60 of the mirror head outer shell 15. Each light reception recess 21 would be defined between recess walls 26 that are a portion of the shell wall 57 and extend inwardly of outer surfaces 23 of the mirror head outer shell 15. In the preferred embodiment, each of the light bodies 59 of the lights 18 mounted within the light reception openings 60 is mounted to the mirror head assembly 11 via engagement of the light body 59 to the recess walls 26 of a respective light reception recess 21. The engagement of light bodies 59 to the recess walls 26 of a respective light reception recess 21 may be any of a number of designs.

Figure 10A:
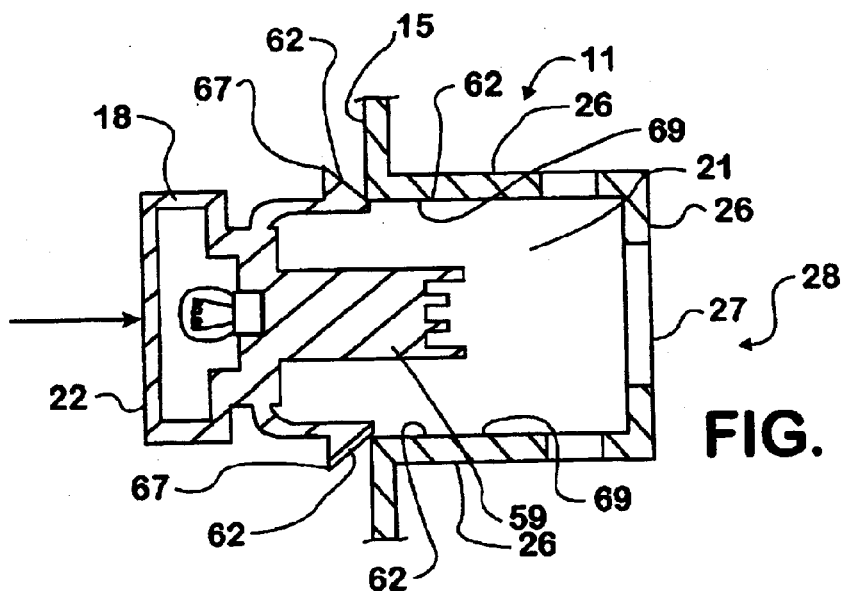
FIG. 10 shows close up views of a section of the light reception recess and a light of the mirror head outer shell through line 9—9 of FIG. 6 during different phases of insertion of the light into the light reception recess.
Figure 10B:
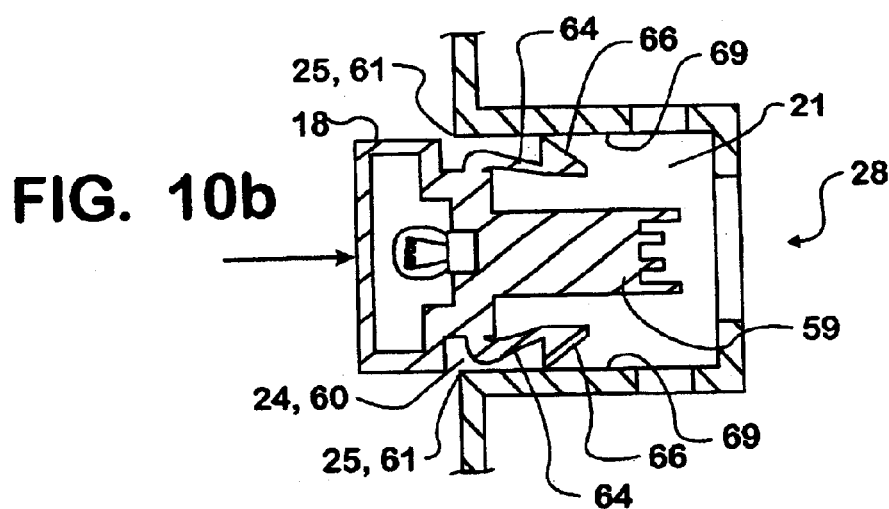
Figure 10C:
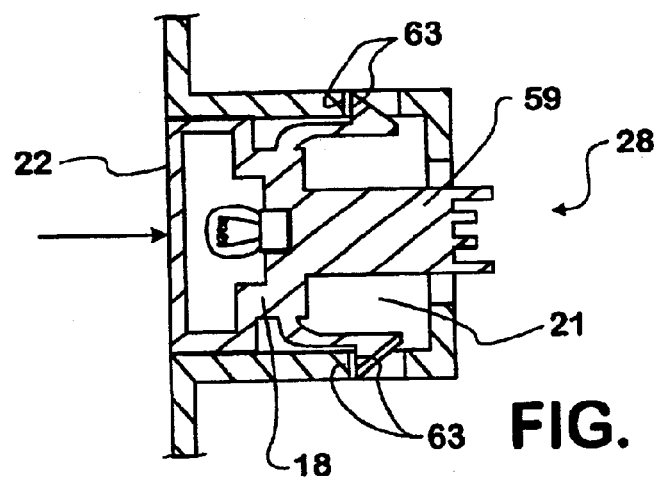
Figure 11:
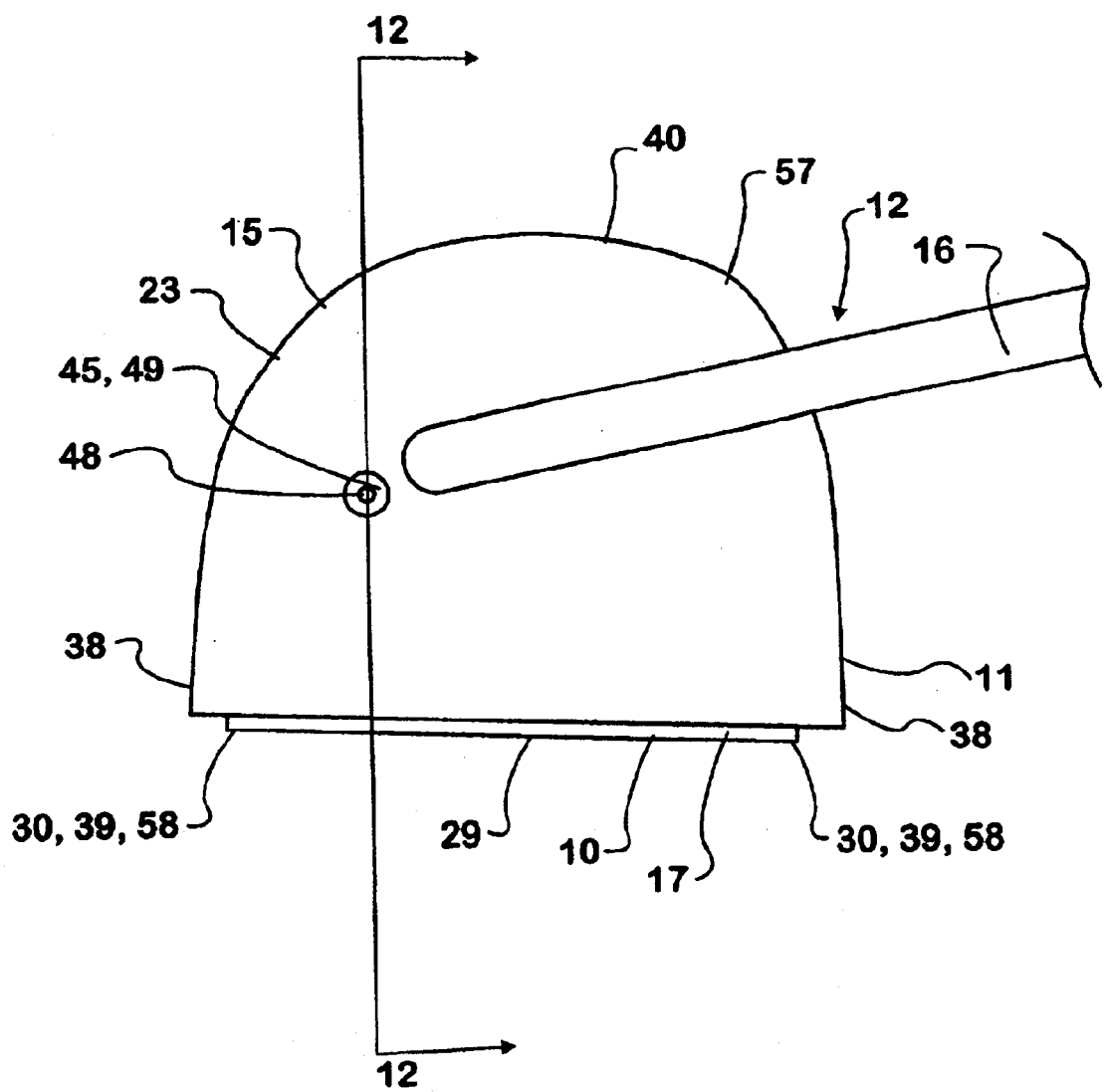
FIG. 11 is a plan view in the direction of the longitudinal axis of the mirror head assembly.
Figure 12:
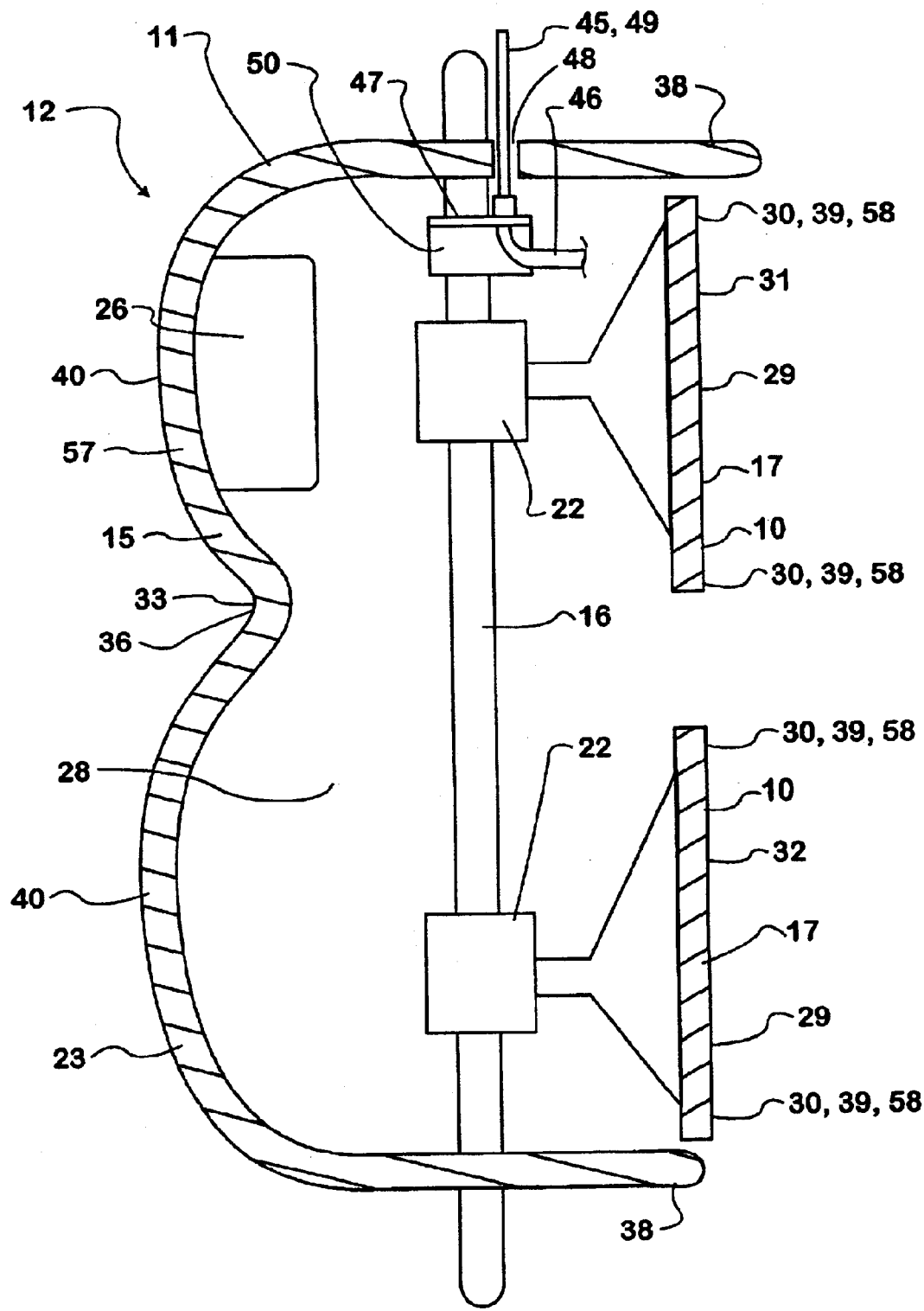
FIG. 12 is a sectional view of the mirror head assembly through line 12—12 of FIG. 11.
Figure 13:
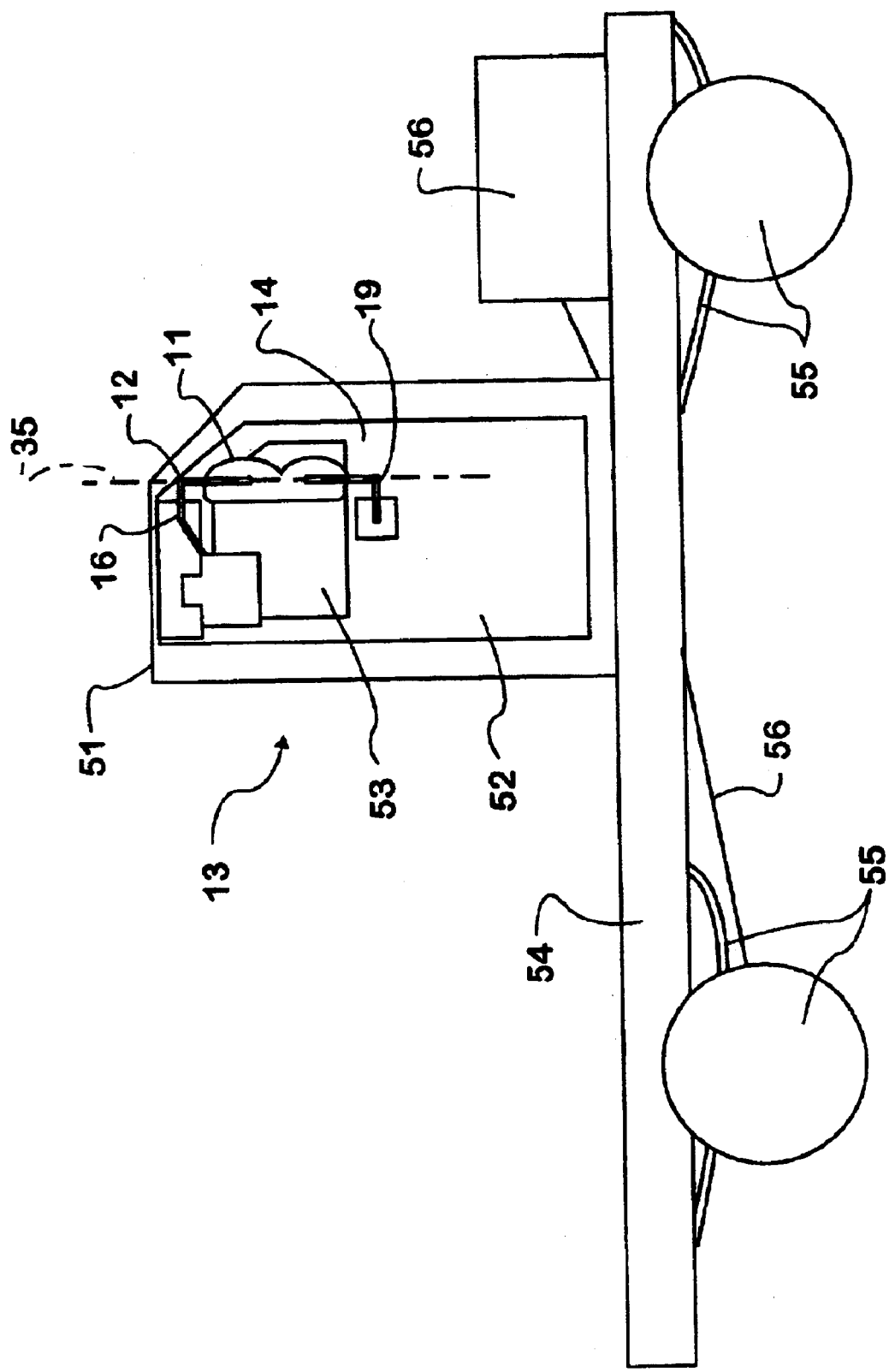
FIG. 13 is a side elevational view of a vehicle with the mirror head assembly and mirror head mounting components of the present invention mounted to it.
Figure 14:
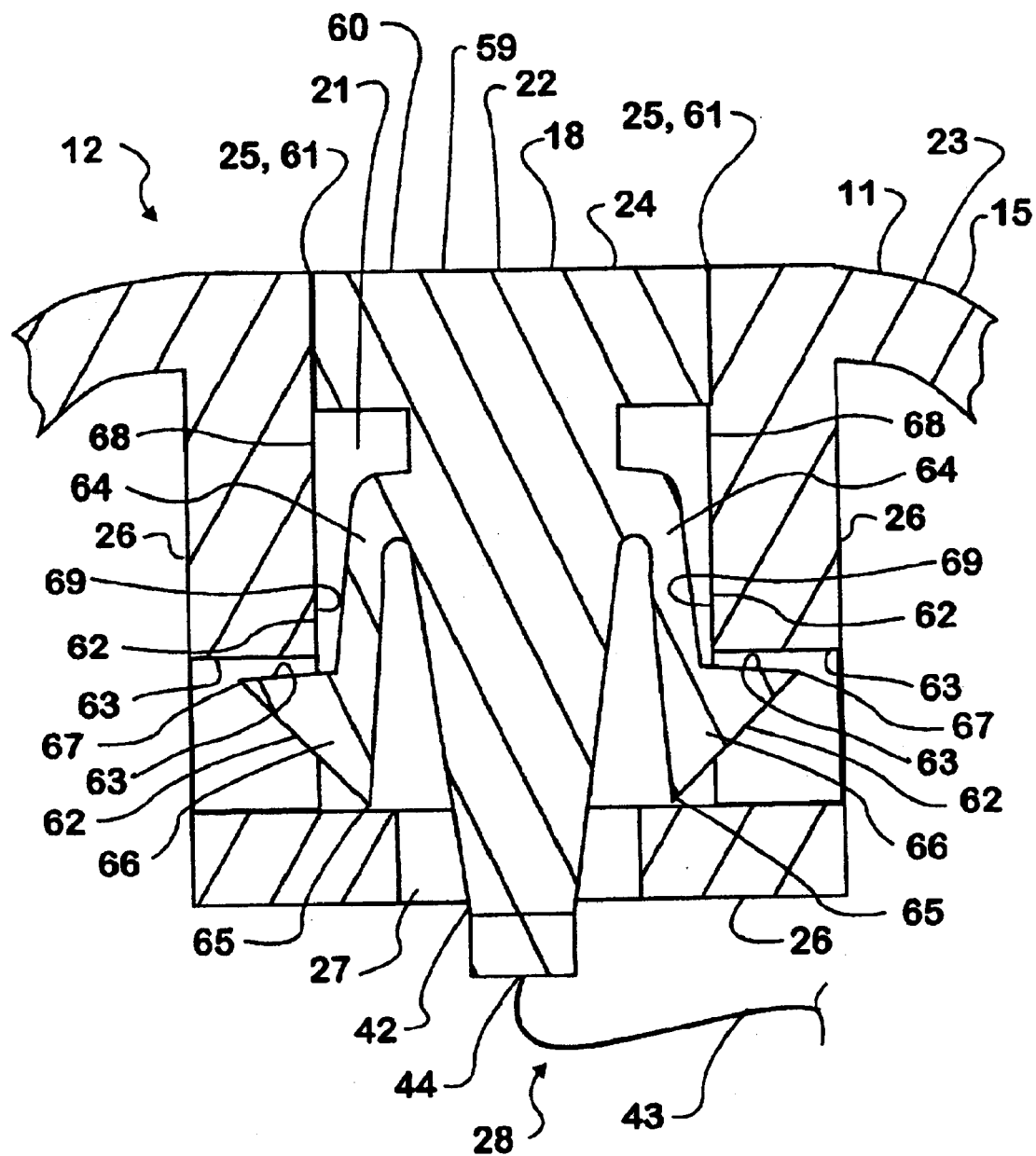
FIG. 14 is a close up view of a section of the light reception recess and a light of the mirror head outer shell through line 9—9 of FIG. 6.

Preferably the engagement of each of the light bodies 59 to the recess walls 26 of a respective light reception recess 21 is of a snap-fit design. A light body 59 and recess walls 26 of a respective light reception recess 21 that are constructed with such a snap-fit are brought into engagement with one another by simply inserting the light body 59 into the light reception recess 21 to its intended installed position. FIG. 10 is a sectional view through a light reception recess 21 and a light body 59 of the preferred embodiment. FIG. 10 illustrates the process of inserting a light body 59 that has a snap-fit with the recess walls 26 of a light reception recess 21 and an example of a construction of the light body 59 and the recess walls 26 that would constitute a snap-fit. The light body 59 is moved from a point outside the light reception recess 21 toward the light reception recess 21. As the light body 59 is inserted into the light reception recess 21, camming surfaces 62 of the light body 59 and the recess walls 26 eventually abut one another. Once these camming surfaces 62 abut one another further insertion of the light body 59 into the light reception recess 21 is prevented until the light body 59 and/or the recess walls 26 deform elastically. The light body 59 and the recess walls 26 are constructed such that, at a point of engagement between the camming surfaces 62 of the two components the camming surfaces 62 are disposed at a relatively small angle relative to the direction of insertion of the light body 59. With a relatively insubstantial urging of the light body 59 in the direction of insertion of the light body 59, the camming surfaces 62 wedge away from one another as the light body 59 and/or the recess walls 26 deform elastically, allowing further insertion of the light body 59. The construction of the light body 59 and the recess walls 26 is such that, as insertion of the light body 59 into the light reception recess is continued the camming surfaces. 62 eventually completely pass each other and no longer engage one another. When the camming surfaces 62 pass each other completely the light body 59 and the recess walls 26 snap from their elastically deformed state back toward their free state. The light body 59 and the recess walls 26 are constructed such that the camming surfaces 62 completely pass and no longer engage each other at a point of insertion of the light body 59 where the light body 59 is approximately in its intended installed position. The light body 59 and the recess walls 26 would be constructed with retention surfaces 63 which are each disposed substantially perpendicular to the direction of insertion of the light body 59 into the light reception recess 21. When the light body 59 is in its intended installed position, the retention surfaces 63 of the light body 59 would be adjacent to the retention surfaces 63 of the recess walls 26. When the light body 59 is so positioned, the retention surfaces 63 of the light body 59 would be disposed upon a side of the retention surfaces 63 of the recess walls 26 in the direction of insertion of the light body 59 into the light reception recess 21. Thus, when the light body 59 is in its intended installed position, movement of the light body 59 in a direction opposite the direction of insertion is prevented by abutment of the retention surfaces 63 of the light body 59 and the retention surfaces 63 of the recess walls 26. In the preferred embodiment, snap tabs 64 protrude from the light body 59 in the direction in which the light body 59 is to be inserted into the light reception recess 21. A snap head 66 is disposed at a forward end 65 of each of the snap tabs 64. Each of the snap heads 66 defines a camming surface 62 on a side of the snap head 66 in the direction of insertion of the light body 59 into the light reception recess 21. The camming surfaces 62 defined upon snap heads 66 disposed upon opposite sides of the light body 59 angle away from each other in a direction opposite the direction of insertion of the light body 59 into the light reception recess 21. Each of the snap heads 66 defines a retention surface 63 on a side of the snap head 66 opposite the direction of insertion of the light body 59 into the light reception recess 21. Recess walls 26 on opposite sides of each light reception recess 21 define camming surfaces 62 that are disposed at a relatively small angle relative to the direction of insertion of the light body 59 into the light reception recess 21. The camming surfaces 62 of the recess walls 26 are disposed such that the camming surfaces 62 of the light body 59 will engage the camming surfaces 62 of the recess walls when the light body 59 is inserted into the light reception recess 21. The recess walls 26 define retention surfaces 63 that are disposed substantially perpendicular to the direction of insertion of the light body 59 into the light reception recess 21. The retention surfaces 63 of the recess walls 26 are disposed on a side of the camming surfaces 62 of the recess walls 26 in the direction of insertion of the light body 59 into the light reception opening 21. When the components are in their free state a distance between outermost points 67 of camming surfaces 62 on opposite sides of the light body 59 is greater than a distance between innermost points 68 of camming surfaces 62 on opposing recess walls 26. As the light body 59 is inserted into the light reception recess 21 the camming surfaces 62 on the snap heads 66 and the camming surfaces 62 on the recess walls 26 abut one another. As a result, the snap tabs 64 and/or recess walls 26 deform elastically away from one another as the camming surfaces 62 pass one another. When the light body 59 reaches its intended installed position within the light reception recess 21 the camming surfaces 62 of the light body 59 pass an inner end 69 of the camming surfaces 62 of the recess walls 26. Once the camming surfaces 62 of the light body 59 are past the camming surfaces 62 of the recess walls 26, the snap tabs 64 and/or recess walls 26 rebound toward their free state. At this point the retention surfaces 63 of the light body 59 are disposed adjacent to and on a side of the retention surfaces 63 of the recess walls 26 in the direction of insertion of the light body 59. Thus, movement of the light body 59 in the direction opposite the direction of insertion of the light body 59 is prevented by abutment of the retention surfaces 63 of the light body 59 against the retention surfaces of the recess walls 26. The example provided herein of the construction of the preferred embodiment is exemplary of one of many different constructions easily imagined by one of ordinary skill in the art of the light body 59 and recess walls 26 which would effect a snap-fit of the components.

Each of the lights 18 mounted to the mirror head assembly 11 has an electrical connection portion 42 that is electrically connected to electricity conducting components 43. The electricity conducting components 43 are, in turn, electrically connected to the electrical system of the vehicle 13 so that electrical power can be provide to the lights 18 by the electrical system of the vehicle 13. Preferably, points of connection 44 between the electrical connection portions 42 of the lights 18 and the electricity conducting components 43 are concealed within either a light reception recess 21 or the interior 28 of the mirror head assembly 11. In the preferred, embodiment recess walls 26 of the light reception recess 21 define one or more electrical connection openings 27. The electrical connection portions 42 of the lights 18 or the electricity conducting components 43 connected to them, may protrude through the one or more electrical connection openings 27. Thus, the points of connection 44 between the lights 18 and the electricity conducting components 43 may be concealed either within the light reception recess 21 or the interior 28 of the mirror head assembly 11. As was mentioned earlier, the mirror head assembly may be constructed with lights 18 mounted with their light bodies 59 outward of the outer surfaces 23 of the mirror head outer shell 15. In such cases, one or more electrical connection openings 27 may be defined by the mirror head outer shell 15 at points behind lights 18 mounted adjacent the mirror head outer shell 15. The electrical connection portions 42 of the lights 18 may protrude through these electrical connection openings 27 defined in the mirror head outer shell 15 into the interior 28 of the mirror head assembly 15. Thus, the points of connection 44 between the lights 18 and the electricity conducting components 43 may be concealed within the interior 28 of the mirror head assembly 11. The electricity conducting components 43, preferably extend from the points of connection 44 between the electricity conducting components 43 and the lights 18 through the interior 28 of the mirror head assembly 11. The electricity conducting components 43 eventually extend out of the interior 28 of the mirror head assembly 11 through one or more openings defined by the mirror head outer shell 15. Concealing the points of connection 44 between the electrical connection portion 42 of the lights 18 and the electricity conducting components 43 as well as concealing a portion of the electricity conducting components 43 within the mirror head assembly has a number of benefits. Concealing these components within the mirror head assembly 11 gives the mirror head assembly 11 an appearance that is generally considered to be more favorable than if the components were not concealed. The lights 18, the electricity conducting components 43, and the connections therebetween are protected from undesirable features of the environment as a result of concealing these components within the mirror head assembly 11.

As was mentioned above, the mirror mounting assembly 12 of the present invention may include more than one mirror 17. In the preferred embodiment the mirror head assembly 11 includes a first mirror 31 and a second mirror 32. The first mirror 31 and the second mirror 32 are positioned such that the reflective surfaces 29 of the first mirror 31 and second mirror 32 face in a substantially similar direction. This is so that an individual might be able to simultaneously look at the reflecting surface 29 of both of the mirrors 17. In this preferred embodiment, a longitudinal axis 35 of the mirror head assembly 11 is disposed substantially in the plane of the reflective surfaces 29 of the mirrors 17 and also in a direction such that each of the mirrors 17 occupies a different position along the longitudinal axis 35. It is desirable to enable the driver and passenger of the vehicle 13 to see as much of the area surrounding the vehicle 13 as possible. For this reason it is preferred that components of the mirror head assembly 11 extend a minimal amount in directions perpendicular to the reflecting surfaces 29 of each of the mirrors 17 beyond the reflecting surface outer boundary 30 of each of the mirrors 17. For this reason, the mirror head outer shell 15 of the preferred embodiment defines a narrow waistline portion 33 that is positioned between the first mirror 31 and the second mirror 32. For purposes of this disclosure a mirror head width 34 is a distance in directions substantially parallel to the reflective surfaces 29 of the mirrors 17 and substantially perpendicular to the longitudinal axis 35 of the mirror head assembly 11 between outer points of the mirror head assembly 11. In the preferred embodiment, portions of the mirror head outer shell 15 constitute the outermost portions of the mirror head assembly 11 in the direction of the mirror head width 34. In such a case, the mirror head width 34 is a distance between outer portions of the mirror head outer shell 15. In the preferred embodiment, the mirror head width 34 of the narrow waistline portion 33 of the mirror head outer shell 15 is considerably less than the mirror head width 34 of the mirror head outer shell 15 at portions adjacent the mirrors 17. In fact, in the preferred embodiment, the narrow waistline 33 of the mirror head outer shell 15 is effected by a waistline groove 36 that is defined by the mirror head outer shell 15. The waistline groove 36 is a portion of the shell wall 57 which is substantially closer to the longitudinal axis 35 of the mirror head assembly 11 than other portions of the shell wall 57 of the mirror head outer shell 15. In the preferred embodiment, this waistline groove 36 extends continuously along the mirror head outer shell 15 between its terminal ends 37 that are disposed between the first mirror 31 and the second mirror 32 and at points near the plane of the reflective surfaces 29 of the mirrors 17. The portion of the mirror head outer shell 15 that defines the waistline groove 36 is disposed primarily upon a side of the mirrors 17 opposite the reflecting surfaces 29 of the mirrors 17. This portion of the mirror head outer shell 15 that defines the waistline groove 36 and is disposed on a side of the mirrors 17 opposite the reflecting surfaces 29 extends a substantial distance from the mirrors 17 in directions perpendicular to and away from the reflecting surfaces 29. Such a mirror head assembly 11 presents less obstruction to the view of a driver and passengers of the vehicle 13 than would a mirror head assembly 11 that did not have a narrow waistline portion 33 between the first mirror 31 and the second mirror 32. It is also contemplated that the mirror head assembly 11 could have more than two mirrors 17. Obviously it would be advantageous for such a mirror head assembly 11 to define narrow sections between each of the mirrors 17 in a manner similar to that of the mirror head assembly 11 of the preferred embodiment.

In the preferred embodiment, the mirror head assembly 11 is an "aero style" mirror head assembly 11. Such an "aero style" mirror head assembly 11 is constructed with such a shape and is mounted to the vehicle 13 in such a position and orientation that as the vehicle 13 travels at speed on roadways, the mirror head assembly 11 presents relatively little aerodynamic drag. The shape of the mirror head outer shell 15 of the preferred embodiment has a few characteristics that make qualify it as an "aero style" mirror head assembly 11. The mirror head outer shell 15 is constructed in such a manner that the outer surfaces 23 of the mirror head outer shell 15 define rear shell portions 38 that are disposed relatively close to and substantially perpendicular to reflecting surface peripheries 39 of the mirrors 17. The outer surfaces 23 of the mirror head outer shell 15 extend from the rear shell portions 38, away from the mirrors 17 on a side of the mirrors 17 opposite the reflecting surfaces 29, and meet at forward shell portions 40. The forward shell portions 40 are a portion of the outer surfaces 23 of the mirror head outer shell 15 distant from the rear shell portions 38. The outer surfaces 23 of the mirror head outer shell 15 curve gently as they extend from the rear shell portions 38 to the forward shell portions 40. For purposes of this disclosure, a mirror head depth 41 is a distance between forward shell portions 40 and rear shell portions 38 of the mirror head outer shell 15 in directions generally perpendicular to the reflecting surfaces 29 of the mirrors 17. The mirror head outer shell 15 of the preferred embodiment is constructed such that the mirror head assembly 11 has a considerable mirror head depth 41 at a majority of sections of the mirror head assembly 11. In the preferred embodiment, for a majority of sections of the mirror head assembly 11 through planes perpendicular to the longitudinal axis 35, the mirror head depth 41 is at least ⅓ of a corresponding mirror head width 34 of the section of the mirror head assembly 11. The mirror head assembly 11 is preferably mounted to the vehicle 13 with the forward shell portions 40 forward of the rearward shell portions 38. As a vehicle 13, that has a mirror head assembly 11 according to the preferred embodiment mounted to it moves forward, an airflow is present past the mirror head outer shell 15. This airflow past the mirror head outer shell 15 first contacts the forward shell portions 40, then travels along the gently curved outer surfaces 23 of the mirror head outer shell 15, and eventually reaches and passes the rear shell portions 38. Because the mirror head assembly 11 of the preferred embodiment has a relatively large mirror head depth 41 and gently curving outer surfaces 23 of the mirror head outer shell 15, the direction of the airflow past the mirror head assembly 11 changes relatively gradually. Thus, a mirror head assembly 11 constructed and mounted to the vehicle 13 according to the preferred embodiment, presents a relatively small aerodynamic drag as the vehicle 13 that the mirror head assembly 11 is mounted to travels at speed on roadways.

The mirror head assembly 11 of the present invention may further have other accessories mounted to it. One accessory that may be mounted to the mirror head assembly 11 is an antenna 45. The antenna 45 may be connected through a connection device 46 to a signal receiving and/or generating device mounted to the vehicle 13. Dependent partially upon what type of signal receiving and/or generating device is connected to the antenna 45, the connection device 46 may have many different forms. In many cases the connection device 46 would be some sort of cable or wire capable of conducting electricity. The signal receiving and/or generating device would receive signals from or send signals to the antenna 45 through the connection device 46. The antenna 45 would be constructed to receive and/or generate signals through a medium such as electromagnetic waves. The antenna 45 could potentially be constructed to receive such signals from and/or produce such signals for reception by a remote signal generating and/or receiving device. One example of a signal receiving and generating device that could be connected to the antenna 45 via the connection device 46 is a citizens band radio. Many other types of signal receiving and/or generating devices could be connected to the antenna 45 mounted to the mirror head assembly 11. In the preferred embodiment, an antenna base 47 is mounted to the mirror head assembly 11 at a point such that the antenna base 47 is disposed within the interior 28 of the mirror head assembly 11. A mast 49 of the antenna 45 extends through an antenna opening 48 defined by the mirror head outer shell 15 and away from the outer surfaces 23 of the mirror head outer shell 15. The mast 49 of the antenna 45 being a portion of the antenna 45 the purpose of which is signal reception and/or generation as opposed to antenna mounting components 50 the purpose of which is to mount the mast 49 to the mirror head assembly 11. Generally, the mast 49 of antennas 45 has a length that is considerably greater than sectional widths of the mast 49 in directions perpendicular to the length of the mast 49. In the preferred embodiment, the mast 49 is the only portion of the antenna 45 that extends beyond the outer surfaces 23 of the mirror head outer shell 15. In the preferred embodiment, a portion of the connection device 46 that is near the antenna 45 is disposed within the interior 28 of the mirror head assembly 11. In this embodiment, the connection device 46 extends from the portion that is near the antenna 45, through the interior 28 of the mirror head assembly 11, and out of the interior 28 of the mirror head assembly 11 through an opening defined by the mirror head outer shell 15.

The mirror head assembly 11 of the present invention may be constructed in one of many different ways and mounted to the vehicle 13 at one of many different locations to accommodate viewing of many different areas surrounding the vehicle 13. In the preferred embodiment, the mirrors 17 of the mirror head assembly 11 are intended to be used as rear view mirrors for the vehicle 13 as is well known. Accordingly, the mirror head assembly 11 of the preferred embodiment is mounted to the vehicle 13 adjacent to or at a distance from exterior surfaces 14 of a door 52 of an occupant cabin 51 of the vehicle 13. The mirror head assembly 11 is also preferably mounted at a height similar to that of a window 53 of the door 52. In this embodiment, the mirror head assembly 11 is positioned such that the reflecting surfaces of the mirrors 17 face in a general direction of a driver of the vehicle 13. In the preferred embodiment the mirror head assembly 11 includes a first mirror 31 that has a reflecting surface 29 that is generally planar. This first mirror 31 is intended for viewing an area behind, to the side of, and relatively distant from the vehicle 13. In the preferred embodiment, the mirror head assembly 11 includes a second mirror 32 that has a reflecting surface 29 that is convex. The purpose of the second mirror 32 is viewing an area behind, to the side of and relatively close to the vehicle 13. The mirror head assembly 11 may have any of a number of constructions and may be positioned in a number of places and orientations relative to the vehicle 13. Thus, the first mirror 31 and the second mirror 32 may be positioned relative to one another in any of a number of ways. In the preferred embodiment, the first mirror 31 and the second mirror 32 are positioned such that their reflecting surfaces 29 are substantially parallel to one another and are disposed one vertically above the other. In this embodiment, the longitudinal axis 35 of the mirror head assembly 11 is disposed substantially vertically.

In the preferred embodiment, the mirror head assembly 11 may have a number of other features that are fairly well known. The first mirror 31 and the second mirror 32 are both engaged to the mirror head assembly 11 in a manner allowing small adjustments of the angle of their reflecting surfaces 29 relative to the other components of the mirror head assembly 11. Some mirror head assemblies 11 may be constructed to allow for remote, power adjustment of the angle of the reflecting surfaces 29 of the mirrors 17 relative to the other components of the mirror head assembly 11. Mirror head assemblies 11 constructed to operate in such a manner generally have electric motors connected to the mirrors 17 via connecting linkages and connected to operator controls within the occupant cabin 51 of the vehicle 13. Any known construction of such a power adjustable mirror system could be utilized in the mirror head assembly 11 of the present invention. It is also well known to mount heating elements to mirrors 17 of mirror head assemblies 11 in order to defog or defrost the mirrors 17. Any known type of mirror heating system could be included in the mirror head assembly 11 of the present invention. In the preferred embodiment, any electricity conducting devices 43 and/or connection devices 46 that are to be connected to such devices as lights 18, antennas 45, electric motors of power mirrors, or mirror heaters are concealed at least partially within the interior of the mirror head assembly 11.

There are some components that most vehicles 13 that the mirror head assembly 11 would be mounted to would have. The vehicle 13 would likely have a frame 54 that is directly or indirectly engaged to a large percentage of the components of the vehicle 13 and which would serve to locate these components relative to one another. The vehicle 13 would also likely have an occupant cabin 51 within which people and or things may reside and be at least partially isolated from undesirable elements of the environment. The occupant cabin 51 would be engaged to and supported by the frame 54. The vehicle 13 would likely have a suspension system 55, engaged to the frame 54, for supporting the frame 54 and, thus, other components of the vehicle 13 and for providing a relatively low resistance to forward motion of the vehicle 13 along the ground. The vehicle 13 may have a powertrain 56, engaged to the frame 54 and the suspension system 55, for providing motivation for the vehicle 13. As mentioned above the vehicle 13 would likely have an electrical system to which electrical components would be connected in a manner that they could receive electrical power from the electrical system.

Those skilled in the art will appreciate that modifications could be made to the invention as described without departing from the spirit and scope of the invention and thus the scope of the invention is limited only by the following claims.

We claim:

1. A mirror head assembly for mounting adjacent to or at a distance from exterior surfaces of a vehicle by mirror head mounting components, and which vehicle has an electrical system, comprising:

a mirror head outer shell which comprises a shell wall;

one or more mirrors mounted adjacent said mirror head outer shell;

wherein said mirror head outer shell is constructed and positioned such that a majority of said mirror head outer shell is disposed on a side of said one or more mirrors opposite a reflecting surface of each of said one or more mirrors;

wherein said mirror head outer shell is constructed and positioned such that some portion of said mirror head outer shell is in line with substantially every portion of said mirrors in directions perpendicular to said reflecting surfaces of said mirrors;

one or more lights that are mounted to said mirror head assembly; and wherein each of said one or more lights mounted to said mirror head assembly is positioned adjacent said mirror head outer shell;

said shell wall of said mirror head outer shell defines a light reception opening within which light body(s) of one or more of said lights mounted to said mirror head assembly are disposed;

said light reception opening is of such a shape and said one or more light body(s) of said lights disposed within said light reception opening is/are of such a shape and is/are position within said light reception opening in a manner such that, outer lens surfaces of said one or more light bodies of said one or more lights disposed within said light reception opening are substantially contiguous and flush with outer surfaces of said mirror head outer shell adjacent said light reception opening;

said one or more mirrors mounted adjacent said mirror head outer shell comprise a first mirror and a second mirror that are mounted to said mirror head assembly;

said first mirror and said second mirror are positioned such that a reflective surface of said first mirror and a reflective surface of said second mirror face in a substantially similar direction;

said mirror head outer shell defines a narrow waistline portion that is disposed between said first mirror and said second mirror;

said narrow waistline portion that said mirror head outer shell defines is a waistline groove that has terminal ends;

said waistline groove extends continuously around said mirror head outer shell between its terminal ends;

each of said terminal ends of said waistline groove is disposed between said first mirror and said second mirror at a point substantially in a same plane as said reflecting surfaces of said mirror;

some portion of said portion of said mirror head assembly that defines said waistline groove is disposed on a side of said mirrors opposite said reflecting surfaces of said mirror and extends substantially away from said mirrors in directions perpendicular to said reflecting surfaces of said mirrors on said side of said mirrors opposite said reflecting surfaces of said mirrors;

said mirror head outer shell constructed such that outer surfaces of said mirror head outer shell define rear shell portions that are relatively close to and substantially perpendicular to reflecting surface peripheries of said mirrors;

said outer surfaces of said mirror head outer shell extend in a gently curving manner from said rear shell portions in directions away from said mirrors on a side of said mirrors opposite said reflecting surfaces and meet at one or more forward shell portions defined by said outer surfaces of said mirror head outer shell;

said mirror head outer shell is constructed such that, for a majority of sections of said mirror head assembly, a mirror head depth from said forward shell portions to said rear shell portions is greater than at least $\frac{1}{3}$ of a corresponding mirror head width;

said mirror head outer shell comprises recess walls between which a light reception recess is defined inwardly of said light reception opening; and said light body(s) of said lights that are disposed within said light reception opening are engaged to said recess walls.

2. A mirror head assembly for mounting adjacent to or at a distance from exterior surfaces of a vehicle by mirror head mounting components, and which vehicle has an electrical system, comprising:

a mirror head outer shell which comprises a shell wall;

one or more mirrors mounted adjacent said mirror head outer shell;

wherein said mirror head outer shell is constructed and positioned such that a majority of said mirror head outer shell is disposed on a side of said one or more mirrors opposite a reflecting surface of each of said one or more mirrors;

wherein said mirror head outer shell is constructed and positioned such that some portion of said mirror head outer shell is in line with substantially every portion of said mirrors in directions perpendicular to said reflecting surfaces of said mirrors;

one or more lights that are mounted to said mirror head assembly;

wherein each of said one or more lights mounted to said mirror head assembly is positioned adjacent said mirror head outer shell;

said shell wall of said mirror head outer shell defines a light reception opening within which light body(s) of one or more of said lights mounted to said mirror head assembly are disposed;

said light reception opening is of such a shape and said one or more light body(s) of said lights disposed within said light reception opening is/are of such a shape and is/are positioned within said light reception opening in a manner such that, outer lens surfaces of said one or more light bodies of said one or more lights disposed within said light reception opening are substantially contiguous and flush with outer surfaces of said mirror head outer shell adjacent said light reception opening;

said mirror head outer shell comprises recess walls between which a light reception recess is defined inwardly of said light reception opening; and said light body(s) of said lights that are disposed within said light reception opening are engaged to said recess walls.

3. A mirror head assembly for mounting adjacent to or at a distance from exterior surfaces of a vehicle by mirror head mounting components, and which vehicle has an electrical system, comprising:

a mirror head outer shell which comprises a shell wall;

one or more mirrors mounted adjacent said mirror head outer shell;

wherein said mirror head outer shell is constructed and positioned such that a majority of said mirror head outer shell is disposed on a side of said one or more mirrors opposite a reflecting surface of each of said one or more mirrors;

wherein said mirror head outer shell is constructed and positioned such that some portion of said mirror head outer shell is in line with substantially every portion of said mirrors in directions perpendicular to said reflecting surfaces of said mirrors;

wherein said one or more mirrors mounted adjacent said mirror head outer shell comprise a first mirror and a second mirror mounted to said mirror head assembly;

wherein said first mirror and said second mirror are positioned such that a reflection surface of said first mirror and a reflective surface of said second mirror face in a substantially similar direction;

wherein said mirror head outer shell defines a narrow waistline portion that is disposed between said first mirror and said second mirror, said mirror head outer shell is constructed such that outer surfaces of said mirror head outer shell define rear shell portions that are relatively close to and substantially perpendicular to reflecting surface peripheries of said mirrors;

said outer surfaces of said mirror head outer shell extend in a gently curving manner from said rear shell portions in directions away from said mirrors on a side of said mirrors opposite said reflecting surface and meet at one or more forward shell portions defined by said outer surfaces of said mirror head outer shell;

said mirror head outer shell is constructed such that, for a majority of sections of said mirror head assembly, a mirror head depth from said forward shell portions to said rear shell portions is greater than at least ⅓ of a corresponding mirror head width;

said narrow waistline portion that said mirror head outer shell defines is a waistline groove that has terminal ends;

said waistline groove extends continuously around said mirror head outer shell between its terminal ends;

each of said terminal ends of said waistline groove is disposed between said first mirror and said second mirror at a point substantially in a same plane as said reflecting surfaces of said mirrors;

some portion of said portion of said mirror head assembly that defines said waistline groove is disposed on a side of said mirrors opposite said reflecting surfaces of said mirrors and extends substantially away from said mirrors in directions perpendicular to said reflecting surfaces of said mirrors on said side of said mirrors opposite said reflecting surfaces of said mirrors;

one or more lights are mounted to said mirror head assembly;

wherein each of said one or more lights mounted to said mirror head assembly is positioned adjacent said mirror head outer shell;

said shell wall of said mirror head outer shell defines a light reception opening within which one or more light body(s) of said one or more lights is disposed;

said light reception opening is of such a shape and said one or more light body(s) of said lights disposed within said light reception opening is/are of such a shape and is/are positioned within said light reception opening in a manner such that outer lens surfaces of said one or more light body(s) of said lights disposed within said light reception opening are substantially contiguous and flush with outer surfaces of said mirror head outer shell adjacent said light reception opening;

an antenna is mounted to said mirror head assembly;

a base of said antenna is disposed within an interior of said mirror head assembly and a mast of said antenna is an only portion of said antenna that protrudes out of said interior of said mirror head assembly through an antenna opening defined by said mirror head outer shell and away from said outer surface of said mirror head outer shell;

said mirror head outer shell comprises recess walls between which a light reception recess is defined inwardly of said light reception opening; and said light body(s) of said lights that are disposed within said light reception opening are engaged to said recess walls.

* * * * *